Oct. 1, 1946. E. A. STALKER 2,408,489
ROTARY WING AIRCRAFT
Filed Jan. 28, 1942 2 Sheets-Sheet 1

INVENTOR
Edward A. Stalker

Oct. 1, 1946.  E. A. STALKER  2,408,489
ROTARY WING AIRCRAFT
Filed Jan. 28, 1942  2 Sheets-Sheet 2
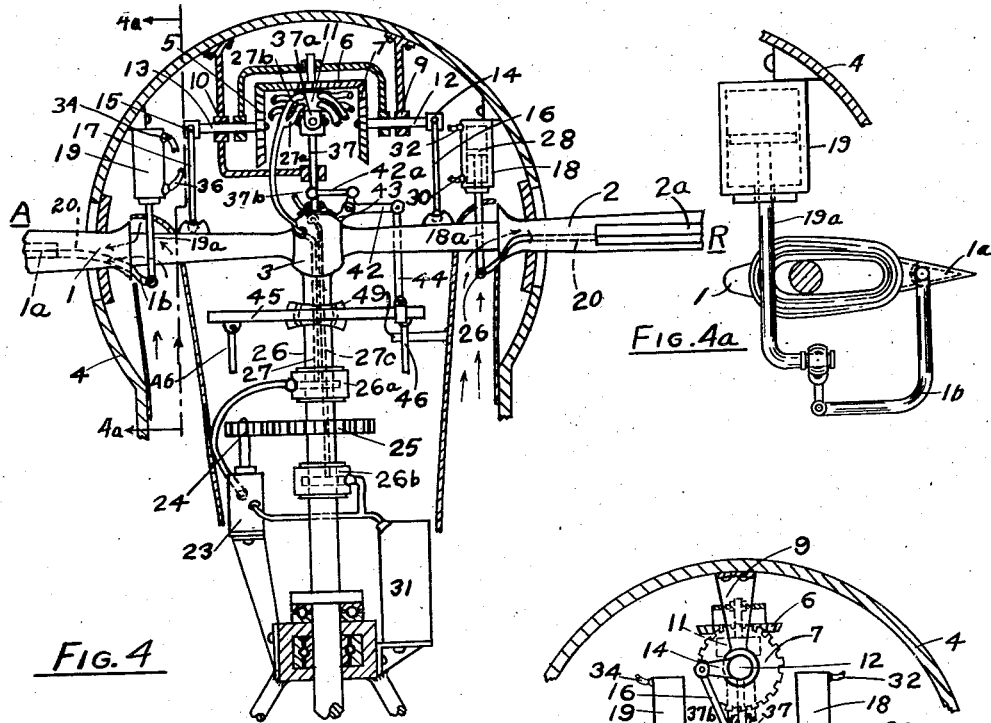
FIG. 4
FIG. 4a
FIG. 5
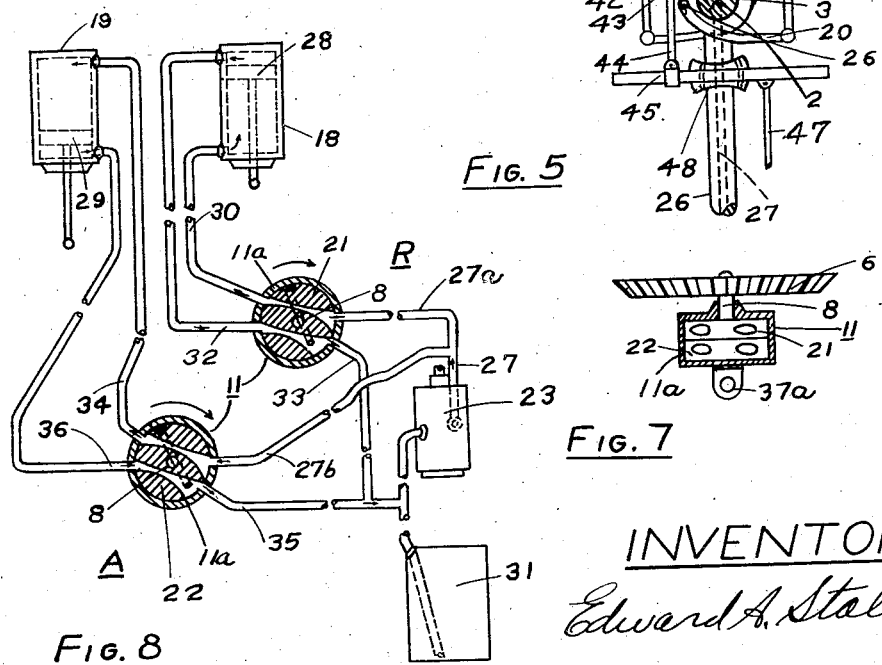
FIG. 7
FIG. 8
INVENTOR
Edward A. Stalker Patented Oct. 1, 1946

2,408,489

UNITED STATES PATENT OFFICE 2,408,489

ROTARY WING AIRCRAFT

Edward A. Stalker, Ann Arbor, Mich.

Application January 28, 1942, Serial No. 428,531

14 Claims. (Cl. 244—17)

My invention relates to direct lift aircraft and particularly to the lifting rotor and its control. It has for its objects first to provide a means of eliminating vibration due to unbalanced aerodynamic and inertia forces normally present in direct lift rotors; and second to provide a means of restricting the amplitude of flapping of the blades. Other objects will appear from the description and drawings.

I accomplish the above objects by the means illustrated in the accompanying drawings in which:

Figures 1 and 2 pertain to the theory;

Figure 4 is a fragmentary section along line 4—4 in Figure 3;

Fig. 4a is a fragmentary section on the line 4a—4a of Fig. 4;

Figure 5 is a section along the line 5—5 in Figure 3;

Figure 7 is an axial section through the valve;

Figure 8 shows sections of the valve at two levels in relation to each other and the pump.

Figure 1:
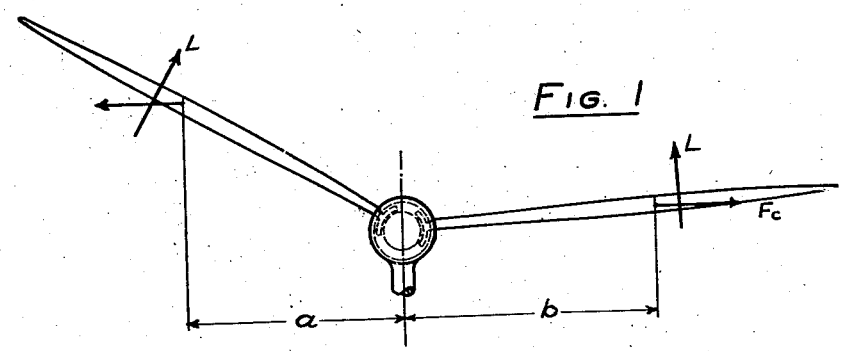

The unbalance in a rotor which causes vibration is apparently always attributed to the unsymmetrical changes in the distance of the center of gravity of the wings from the axis of rotation. Thus in Figure 1 if one blade flaps up more than the opposite one, the radii a and b are of different length and so there is an unbalanced centrifugal force.

Figure 2:
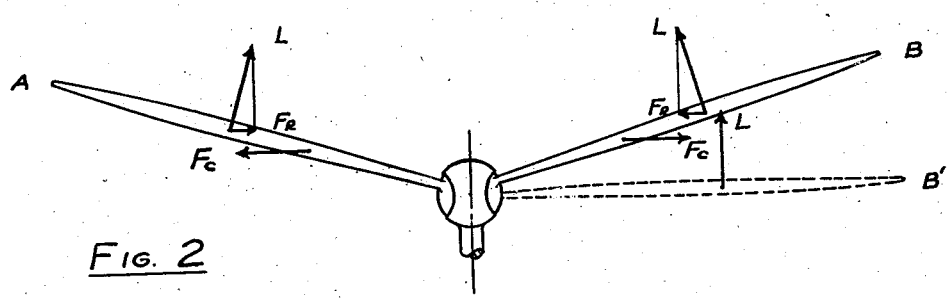

I have found that the aerodynamic forces also play a role in causing vibration. In Figure 2 the blades in the positions A and B' have the lifts L acting upon them. Wing A produces the radial force F$_R$ while wing B' does not. This periodic unbalanced force will cause vibration.

If opposite blades are made to oscillate upward through equal angles as illustrated by positions A and B each lift L produces a radial force F$_R$ and there is no vibration because these forces balance. In this same instance the centrifugal forces are balanced because the distances to the centers of gravity are equal.

I have devised a rotor wherein the blades are constrained to flap symmetrically to accomplish the balance of forces just described.

Referring particularly to Figures 3 to 6 the blades are 1 and 2 pivotally supported in the ball 3 for vertical flapping. The angle of attack of a blade is changed by altering the attitude of the flap 1a or 2a about a spanwise axis.

Mounted in the hub housing 4 (Figures 4 and 5) is the differential valve gear comprised in part of the bevel gears 5, 6 and 7. Gear 6 carries a shaft 8 which is part of valve 11 (Figure 7). The gears 5 and 7 are fixed to shafts 12 and 13 rotatably borne in the hub 4 at 9 and 10. Each shaft carries an arm 14 and 15 respectively, which are attached by links 16 and 17 respectively to blades 2 and 1; thus the position of gears 5 and 7 corresponds to the flap angles of the respective blades.

If both blades 1 and 2 flap upward gears 5 and 7 are rotated but gear 6 is not rotated about the axis of shaft 8 although it is rotated about the axis of shafts 12 and 13. Only the rotation about the axis of 8 changes the valve 11, which governs the flow of fluid under pressure to the cylinders 18 and 19. These have pistons connected to arms 20 on the torque tubes 2b and 1b. Rotations of the torque tubes turn the flaps 2a and 1a about their respective axes lying along the span of the blades. The flaps alter the angles of attack of the blades.

If the blade 1 which is the advancing blade as indicated by A Figure 4 rises while blade 2 the retreating blade R does not, the gear 6 will be rotated about the axis of 8 and fluid pressure will be applied through valve 11 to increase the angle of attack of blade 2 by rotating the flap 2a and thereby increase the lift and cause blade 2 to rise. If in addition to blade 1 rising blade 2 also descends the rotation of gear 6 is increased to send a greater fluid pressure to cylinder 18 to make blade 2 rise.

What has been said of blade 1 acting to govern blade 2 applies to the control of blade 1 by blade 2 when the latter is in the advancing position at A. To accomplish this the valve 11 has two cylinders, 21 and 22, one for the control of each blade. In Figure 8 the cylinder 21 controls blade 2 by the agency of blade 1 while the cylinder 22 controls blade 1 through the agency of blade 2. Both cylinders are fixed to the same shaft 8. Fluid pressure is generated in the pump 23 driven by the gears 24 and 25, the latter fixed to the shaft 26 rotated with or by the blades. This fluid is transmitted upward by tube 27 having the flexible extension 27a and 27b to the valve 11 which distributes it to the proper sides of the pistons 28 and 29.

If blade 1 at A is causing blade 2 to rise, fluid from the pump 23 enters the valve through tube 27a, and is sent through tube 30 to the bottom side of piston 28. The flap of blade 2 is then rotated to increase its angle of attack and cause blade 2 to rise.

Fluid from the top of cylinder 18 is returned to the sump 31 by the tubes 32 and 33.

If blade 2 is causing blade 1 to descend the valve cylinder 22 is turning as indicated in Figure 8. Fluid is entering cylinder 22 by branch tube 27b of 27 and goes by way of tube 34 to the top of cylinder 19 to decrease the angle of attack of the blade 1 by rotating flap 1a.

Figure 9:
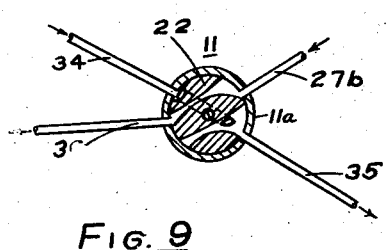
Figure 9 shows a valve cylinder in a different position than Figure 8.

Figure 9 shows the valve cylinder 22 position if the blade 1 is to be made to ascend when in position R, the duct 34 running to the bottom of cylinder 19. Tubes 35 and 36 conduct return fluid to the sump 31.

It will now be clear that each blade tends to regulate the flapping of the other. That is the blade in the advancing position tends to make the descending blade rise and the blade in the descending position tends to make the ascending blade descend.

Manual control is obtained by rotating the barrel 11a of the valve 11 as illustrated best in Figures 4, 5, and 7. The valve barrel 11a has a universal joint 37a connecting it to the shaft 37. This joint has the intersection of its axes on the axis of shafts 12 and 13. Thus the valve barrel 11a is free to rotate about the axis of 12 and 13 for any angular position of shaft 37 which is rotated by the manual control. This is done by means of arm 37b, Figures 4 and 5, projecting from 37 and connected by link 42a to the bell crank 42. It is rotatably supported on the ball 3 by the bracket 43.

The lever 42 is actuated by the rod 44 whose lower and travels on the disk 45 which is universally tiltable about the spherical segment 48 by the pilot by means of rod 46 and another one 47 disposed 90° around from 46. The disk 45 is restrained from rotation by suitable lugs 49 projecting past the rods 46 and 47.

When the barrel 11a is displaced from its normal attitude the mean plane of the blades is tilted with respect to the axis of rotation. The blades continue to flap symmetrically with respect to this tilted plane. Thus the rotatable barrel makes it feasible to roll or pitch the aircraft while maintaining the balance of forces tending to cause vibration.

In addition to the control exercised by the mechanism the flapping of the blades also causes changes in angle of attack by rotating the flap. Thus if blade 1 rises, the flap is made to rise because the crank arm 1b presses against the rod 19a. The flap rise decreases the lift. Thus this arrangement seeks to keep the flapping angle small and so the differential mechanism has initially only small flapping displacements to compensate.

One of the features of this invention is that the flapping of a blade is controlled by the other blade opposite to it so that no movement of the first said blade is necessary to change its lift. An additional feature is that any angular movement of the blade up or down changes the lift to suppress the movement and thus cooperate with the differential gear which makes the blades flap symmmetrically.

Thus there are two lift effects superimposed on the effect deriving from the control of one blade by the opposite blade, namely the control effect due to rotating barrel 11a and the effect due to the flap connection to the rod 19a. This last control is symmetrical since if both blades tend to rise both receive a decrease in lift. The effect from the control of barrel 11a is unsymmetrical. The combination of a symmetrical and an unsymmetrical lift effect is a feature of this invention.

Figures 6, 6A:
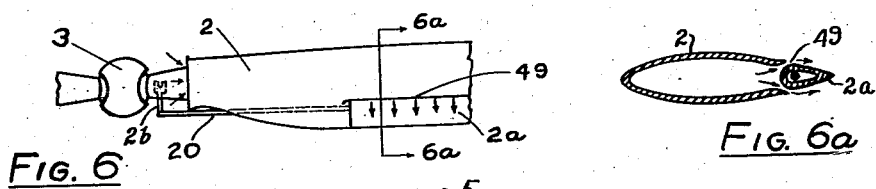
Figure 6 is a fragmentary plan view of a blade.
Figure 6a is a section along 6a—6a in Figure 6.
Figure 3:
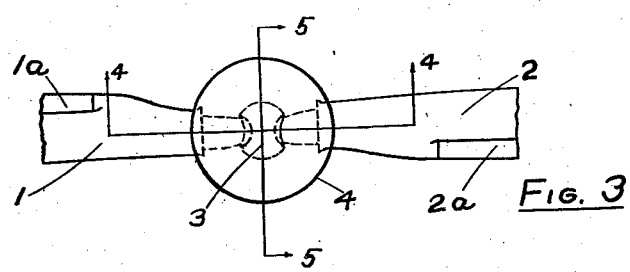
Figure 3 is a fragmentary plan view of the rotor.

The blades are rotated about the upright axis by fluid pumped through the hub in the manner described in my U. S. Patent No. 2,084,464. The wing slots 49 are formed between the flaps and the main part of the blade as indicated in Figure 6.

While I have illustrated a certain specific form of the invention it is to be understood that I do not intend to limit myself to this exact form but intend to claim my invention broadly as indicated by the scope of the appended claims.

I claim:

1. In an aircraft, in combination, a plurality of blades, means for mounting said blades for rotation about an upright axis and for independent vertical flapping about an axis separate transverse to said upright axis, means to vary the lifts of the respective blades, and means interconnecting each said blade with the lift varying means of a blade on the opposite side of said upright axis for controlling the lift of one blade by a function of flapping of another blade on the opposite side of said vertical axis and independently of the flapping position of said one blade.

2. In an aircraft, in combination, a plurality of blades, means for mounting said blades for rotation about an upright axis and for independent vertical flapping about an axis transverse to said upright axis, means to vary the lifts of the blades, automatic means to control the lift of one blade by a function of flapping of another blade on the opposite side of said vertical axis coincidentally with the control of the lift of the second said blade by a function of flapping of the first said blade, and means to superimpose a change of lift on said plurality of blades unsymmetrically relative to said upright axis while substantially maintaining the action of said automatic means.

3. In an aircraft in combination, a plurality of blades, means for mounting the blades for rotation about an upright axis and for independent vertical flapping about a common axis transverse to said upright axis, hydraulic means operable independently to vary the lifts of the different blades, and automatic means to control the lift of one blade by a function of flapping of another blade on the opposite side of said vertical axis coincidentally with the control of the lift of the second said blade by a function of flapping of the first said blade.

4. In an aircraft in combination, a plurality of blades, means for mounting the blades for rotation about an upright axis and for independent vertical flapping about an axis transverse to said upright axis, means to vary the lifts of the blades, automatic means to control the lift of one blade by a function of flapping of another blade on the opposite side of said vertical axis coincidentally with the control of the lift of the second said blade by a function of flapping of the first said blade, and means to superimpose a change of lift on said plurality of blades symmetrically relative to said upright axis while substantially maintaining the action of said automatic means.

5. In an aircraft in combination, a plurality of blades, means for mounting said blades for rotation about an upright axis and for independent vertical flapping about an axis transverse to said vertical axis, and means to induce opposite blades to flap substantially independently in the same direction including controllable power actuated means to effect variation of the lifts of opposite blades independently, and a differential device operably connected to said blades and responsive to the respective flapping angles thereof so that unsymmetrical flapping controls said power actuated means to establish symmetrical flapping.

6. In an aircraft in combination, a plurality of blades, means for mounting said blades for rotation about an upright axis and for independent vertical flapping about an axis transverse to said upright axis, separate means associated with each blade to vary the lift thereof, separate means to actuate said lift varying means and means responsive to a change in the flap angle of a blade on one side of said upright axis to control said actuating means associated with a blade on the opposite side of said upright axis to effect a change in the lift thereof leaving said actuating means associated with the blade on one side of the said upright axis substantially unaffected by the change in the flap angle of said blade.

7. In an aircraft in combination, a plurality of blades, means for mounting said blades for rotation about an upright axis and for independent vertical flapping about an axis transverse to said upright axis, means associated with each blade to vary the lift thereof, and means responsive to a decrease or increase in the flap angle of a blade on one side of said upright axis to actuate the lift varying means associated with a blade on the opposite side of said upright axis to effect a corresponding increase or decrease in the lift thereof, and means for controlling the amount of said change in lift.

8. In an aircraft in combination, a plurality of blades, means for mounting said blades for rotation about an upright axis and for independent vertical flapping about an axis transverse to said upright axis, means associated with each blade to vary the lift thereof, and means responsive to a differential change of the flap angle of one of said blades with respect to another to actuate the lift varying means associated with a blade on the opposite side of said upright axis in a direction to produce a change in the lift thereof resulting in a corresponding change of flap angle thereof leaving the lift varying means associated with the first said blade substantially unaffected.

9. In an aircraft in combination, a plurality of blades, means for mounting said blades for rotation about an upright axis and for independent vertical flapping about an axis transverse to said upright axis, means associated with each blade to vary the lift thereof, and means responsive to a change in the flap angle of either an advancing or a retreating blade relative to an oppositely traveling blade for actuating the lift varying means associated with said oppositely traveling blade in a direction to produce a change in the lift thereof such as to bring about a corresponding change in the flap angle thereof, and controllable means for varying the amount of said change in lift.

10. In an aircraft in combination, a plurality of blades, means for mounting said blades for rotation about an upright axis and for independent vertical flapping about an axis transverse to said vertical axis, adjustable flap means associated with each blade for changing the angle of attack and the lift thereof, and means responsive to a change in the flap angle of a blade on one side of said upright axis relative to a blade on the opposite side thereof to actuate the adjustable flap means associated with said blade on the opposite side of said axis to change the angle of attack and effect a corresponding change in the lift thereof.

11. In an aircraft in combination, a plurality of blades, means for mounting said blades for rotation about an upright axis and for independent vertical flapping about an axis transverse to said vertical axis, means associated with each blade to vary the lift thereof, means responsive to a change in the flap angle of a blade on one side of said upright axis to actuate the lift varying means associated with a blade on the opposite side of said upright axis to effect a change in the lift thereof, and controllable means for tilting the mean plane of the blades with respect to said upright axis of rotation to provide a predetermined roll or pitch of the aircraft while maintaining the forces tending to cause vibration substantially in balance.

12. In an aircraft in combination, a hub, a plurality of blades, means for mounting said blades on said hub for rotation about an upright axis and for independent vertical flapping about an axis transverse to said upright axis, adjustable flap means associated with each said blade for changing the angle of attack and the lift thereof, separate power actuated means independently connected to said flap means for affecting movement thereof, and means responsive to a change in the flap angle of a blade on one side of said upright axis relative to a blade on the opposite side thereof to control the power actuated means associated with said blade on the opposite side of said axis to change the angle of attack and effect a corresponding change in the lift thereof.

13. In an aircraft in combination, a hub, a plurality of blades, means for mounting said blades on said hub for rotation about an upright axis and for independent vertical flapping about an axis transverse to said upright axis, adjustable flap means associated with each said blade for changing the angle of attack and the lift thereof, separate power actuated means connected to said flp means respectively for effecting movement thereof relative to said hub, and means responsive to a change in the flap angle of a blade on one side of said upright axis relative to a blade on the opposite side thereof to control the power actuated means associated with said blade on the opposite side of said axis to change the angle of attack of the flap means of that blade and to effect a corresponding change in the lift thereof.

14. In an aircraft in combination, a hub, a plurality of blades, means for mounting said blades on said hub for rotation about an upright axis and for independent vertical flapping about an axis transverse to said upright axis, adjustable flap means associated with each said blade for changing the angle of attack and the lift thereof, separate power actuated means connected to said flap means respectively for effecting movement thereof relative to said hub and for retaining its associated flap means in predetermined fixed relation to said hub but movable relative to its associated blade in response to flapping movement of the latter, and means responsive to a change in the flap angle of a blade on one side of said upright axis relative to a blade on the opposite side thereof to control the power actuated means associated with said blade on the oposite side of said axis to change the angle of attack of the flap means of that blade and to effect a corresponding change in the lift thereof.

EDWARD A. STALKER.